US012719356B2

(12) United States Patent
Lee et al.

(10) Patent No.: US 12,719,356 B2
(45) Date of Patent: Aug. 25, 2026

(54) ELECTRONIC APPARATUS COMPRISING PFC CIRCUIT AND CONTROL METHOD THEREOF

(71) Applicant: SAMSUNG ELECTRONICS CO., LTD., Suwon-si (KR)

(72) Inventors: Jiwon Lee, Suwon-si (KR); Sungyong Joo, Suwon-si (KR); Junhyun Won, Suwon-si (KR); Taejun You, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 18/625,977

(22) Filed: Apr. 3, 2024

(65) Prior Publication Data

US 2024/0266950 A1 Aug. 8, 2024

Related U.S. Application Data

(63) Continuation of application No. PCT/KR2024/001736, filed on Feb. 6, 2024.

(30) Foreign Application Priority Data

Feb. 8, 2023 (KR) ........................ 10-2023-0017030

(51) Int. Cl.
*H02M 1/42* (2007.01)
*H02M 1/00* (2006.01)

(52) U.S. Cl.
CPC ....... *H02M 1/4208* (2013.01); *H02M 1/0035* (2021.05); *H02M 1/42* (2013.01)

(58) Field of Classification Search
CPC .... H02M 1/4225; H02M 1/0009; H02M 1/00; H02M 1/08; H02M 1/42; H02M 1/007;
(Continued)

(56) References Cited

U.S. PATENT DOCUMENTS 6,519,165 B2 2/2003 Koike
6,903,536 B2 6/2005 Yang
(Continued)

FOREIGN PATENT DOCUMENTS

CN 1980020 A 6/2007
CN 104242640 A 12/2014
(Continued)

OTHER PUBLICATIONS

International Search Report (PCT/ISA/210) issued on May 17, 2024 by the International Searching Authority in International Application No. PCT/KR2024/001736.
(Continued)

*Primary Examiner* — Crystal L Hammond
*Assistant Examiner* — Jonathan Walter Soileau
(74) *Attorney, Agent, or Firm* — Sughrue Mion, PLLC

(57) ABSTRACT

An electronic apparatus includes a power factor correction (PFC) circuit including an inductor and a switch serially connected to the inductor, and a control circuit. The control circuit, based on an amount of current flowing in the PFC circuit being less than or equal to a threshold current, operates the PFC circuit in a standby mode, and based on an output voltage of the PFC circuit being less than a threshold output voltage corresponding to the standby mode, adjusts the output voltage to correspond to a reference voltage by applying a signal for on-off control of the switch in the PFC circuit to the switch. The control circuit identifies an on-off frequency of the switch based on a reference current level for limiting a peak current of the inductor included in the PFC circuit in the standby mode, and applies the signal to the switch based on the on-off frequency.

18 Claims, 10 Drawing Sheets

(58) Field of Classification Search
CPC ...... H02M 3/01; H02M 3/33571; H02M 1/10; H02M 1/12; H02M 1/36; H02M 3/06; H02M 3/28; Y02B 70/10; H04H 20/44
See application file for complete search history.

(56) References Cited

U.S. PATENT DOCUMENTS

| | | | |
|---|---|---|---|
| 7,957,162 B2 | 6/2011 | Choi et al. | |
| 8,576,589 B2 | 11/2013 | Melanson et al. | |
| 8,625,308 B2 | 1/2014 | Kim et al. | |
| 9,001,541 B2 | 4/2015 | Cho et al. | |
| 9,112,425 B2 | 8/2015 | Prescott et al. | |
| 9,252,668 B2 | 2/2016 | Hu et al. | |
| 9,564,826 B2 | 2/2017 | Sugahara et al. | |
| 10,069,403 B1 | 9/2018 | Lim et al. | |
| 10,332,474 B2 | 6/2019 | Joo et al. | |
| 10,389,233 B1 | 8/2019 | Lim | |
| 11,764,667 B2 | 9/2023 | Yamada et al. | |
| 2002/0067629 A1 | 6/2002 | Koike | |
| 2014/0009978 A1 | 1/2014 | Brinlee et al. | |
| 2014/0043877 A1 | 2/2014 | Ishii | |
| 2020/0204065 A1* | 6/2020 | Masuda | H02M 1/4225 |
| 2024/0136920 A1* | 4/2024 | Woo | H02M 1/385 |

FOREIGN PATENT DOCUMENTS

| | | | |
|---|---|---|---|
| CN | 109004810 A | 12/2018 |
| JP | 2002-171760 A | 6/2002 |
| JP | 2016-52161 A | 4/2016 |
| JP | 2022-96152 A | 6/2022 |
| KR | 10-2013-0019741 A | 2/2013 |
| KR | 10-1274214 B1 | 6/2013 |
| KR | 10-1658208 B1 | 9/2016 |
| KR | 10-2017-0120419 A | 10/2017 |
| KR | 10-1915240 B1 | 1/2019 |
| KR | 10-2423307 B1 | 7/2022 |
| WO | 03/052908 A2 | 6/2003 |

OTHER PUBLICATIONS

Written Opinion (PCT/ISA/237) issued on May 17, 2024 by the International Searching Authority in International Application No. PCT/KR2024/001736.

Communication dated Feb. 3, 2026 issued by the European Patent Office in European Patent Application No. 24753605.5.

Laxzlo HUBER et al., "Methods of Reducing Audible Noise Caused by Magnetic Components in Variable-Frequency-Controlled Switch-Mode Converters", IEEE Transactions On Power Electronics, vol. 26, No. 6, Jun. 1, 2011, XP011336132, ISSN: 0885-8993, DOI: 10.1109/TPEL.2010.2089700, pp. 1673-1681 (9 pages total).

Shu Fan Lim et al., "A multimode digital control scheme for boost PFC with higher efficiency and power factor at light load", Applied Power Electronics Conference and Exposition (APEC), 2012 Twenty-Seventh Annual IEEE, IEEE, Feb. 5, 2012, XP032127683, DOI: 10.1109/APEC.2012.6165833, ISBN: 978-1-4577-1215-9, pp. 291-298 (8 pages total).

* cited by examiner

ELECTRONIC APPARATUS COMPRISING PFC CIRCUIT AND CONTROL METHOD THEREOF

CROSS-REFERENCE TO RELATED APPLICATIONS

This application is a continuation application of International Application No. PCT/KR2024/001736, filed on Feb. 6, 2024 in the Korean Intellectual Property Office, which is based on and claims priority under 35 U.S.C. § 119 to Korean Patent Application No. 10-2023-0017030, filed on Feb. 8, 2023, in the Korean Intellectual Property Office, the disclosures of each of which being incorporated by reference herein in their entireties.

BACKGROUND

1. Field

The disclosure relates to an electronic apparatus and a control method thereof, and more particularly, to an electronic apparatus that controls a burst mode of a power factor correction (PFC) circuit, and a control method thereof.

2. Description of Related Art

Currently, various types of electronic apparatuses are being developed and distributed, and in particular, recently, electronic apparatuses (e.g., display apparatuses) that are thin are being developed and distributed, etc.

In a power factor correction (PFC) circuit operating in a burst mode, there is a disadvantage that noise is generated according to magnetic interference. Accordingly, there has been a demand for a method of preventing generation of noise in a PFC circuit operating in a burst mode due to a peak current.

SUMMARY

In accordance with an aspect of the disclosure, an electronic apparatus may include a power factor correction (PFC) circuit including an inductor and a switch serially connected to the inductor; and a control circuit configured to, based on an amount of current flowing in the PFC circuit being less than or equal to a threshold current, operate the PFC circuit in a standby mode, and based on an output voltage of the PFC circuit being less than a threshold output voltage corresponding to the standby mode, adjust the output voltage such that the output voltage corresponds to a reference voltage by applying a signal for on-off control of the switch included in the PFC circuit to the switch. The control circuit is further configured to identify an on-off frequency of the switch based on a reference current level for limiting a peak current of the inductor included in the PFC circuit in the standby mode, and apply the signal to the switch based on the on-off frequency.

In accordance with another aspect of the disclosure, a control method of an electronic apparatus comprising a power factor correction (PFC) circuit that includes an inductor and a switch serially connected to the inductor and a control circuit controlling operations of the PFC circuit, may include, based on an amount of a current flowing in the PFC circuit being less than or equal to a threshold current, operating the PFC circuit in a standby mode; and based on an output voltage of the PFC circuit being less than a threshold output voltage corresponding to the standby mode, adjusting the output voltage such that the output voltage corresponds to a reference voltage by applying a signal for on-off control of the switch included in the PFC circuit to the switch. The adjusting the output voltage may comprise identifying an on-off frequency of the switch based on a reference current level for limiting a peak current of the inductor in the standby mode; and applying the signal to the switch based on the on-off frequency of the switch.

In accordance with another aspect of the disclosure, an electronic apparatus may include a power factor correction (PFC) circuit including an inductor and a switch serially connected to the inductor; and a control circuit configured to detect an amount of current flowing in the PFC circuit and, based on the amount of current being less than or equal to a threshold current, control the PFC circuit to operate the PFC circuit in a standby mode, identify an on-off frequency of the switch based on a reference current level for limiting a peak current of the inductor in the PFC circuit in the standby mode; and detect an output voltage of the PFC circuit and, based on the output voltage being less than a threshold output voltage that corresponds to the standby mode, adjust the output voltage to correspond to a reference voltage by applying a signal with the on-off frequency to the switch included in the PFC circuit.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
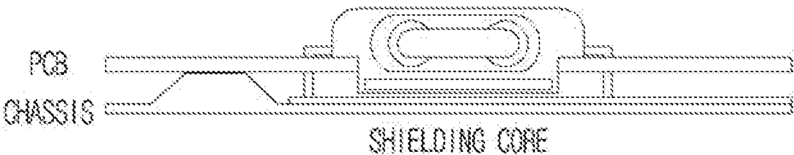
FIG. 1 is a diagram for illustrating a cause for generation of noise by a peak current in a power factor correction (PFC) circuit according to the related art technology.
Figure 1:
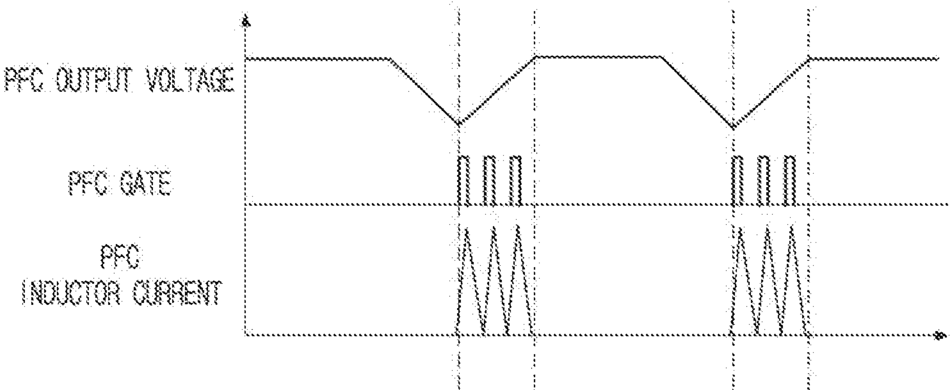

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

In addition, terms such as “first,” “second,” and the like may be used to describe various elements, but the terms are not intended to limit the elements. Such terms are used only to distinguish one element from another element. Thus, as used herein, the terms “1st” or “first” and “2nd” or “second” may use corresponding components regardless of importance or order and are used to distinguish one component from another without limiting the components.

Further, singular expressions include plural expressions, unless defined obviously differently in the context. Also, in the disclosure, terms such as “include” and “consist of” should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Also, in the disclosure, “a module” or “a part” performs at least one function or operation, and may be implemented as hardware or software, or as a combination of hardware and software. In addition, a plurality of “modules” or a plurality of “parts” may be integrated into at least one module and implemented by at least one processor (not shown), except “a module” or “a part” that needs to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a cause for generation of noise by a peak current in a power factor correction (PFC) circuit according to a related art technology.

Referring to FIG. 1, in various types of electronic apparatuses (e.g., a display apparatus, etc.), holes are formed in a circuit board (e.g., a PCB) in the electronic apparatus such that components may be arranged in the holes formed and a total thickness of the electronic apparatus may become thinner.

However, as components arranged in the holes are located to be adjacent to a chassis metal of the electronic apparatus, there is a disadvantage that heating of the components and noise are generated due to magnetic interference between the components and the metal.

In particular, in a PFC circuit operating in a burst mode, there is a disadvantage that noise is generated as a core of a component is shaken according to magnetic interference between a line filter and a chassis metal due to a peak current of an AC line.

This noise may be prevented by applying a shielding core for shielding to the lower end of the line filter, but in case a shielding core for shielding is applied, there are disadvantages that the unit price for manufacturing rises, and workability is reduced, etc.

To address these and other disadvantages, in the disclosure, various embodiments of preventing generation of noise in a PFC circuit operating in a burst mode due to a peak current even if a shielding core for shielding is not applied will be described.

Figure 2:
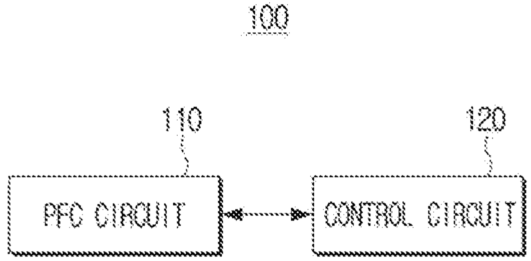
FIG. 2 is a block diagram for illustrating a configuration of an electronic apparatus according to an embodiment.

FIG. 2 is a block diagram for illustrating a configuration of an electronic apparatus according to an embodiment.

An electronic apparatus 100 according to various embodiments may include a power factor correction (PFC) circuit 110 and a control circuit 120.

The electronic apparatus 100 may receive an image signal by performing wired/wireless communication with an external apparatus such as a PC, a set-top box, etc., or receive an image signal by using a tuner, etc. provided in the electronic apparatus 100, or receive an image signal by using image data stored in a storage provided in the electronic apparatus 100. In other words, in some embodiments, the electronic apparatus 100 may further include additional components to those illustrated in FIG. 1, such as a tuner, a storage, etc. The electronic apparatus 100 may provide the image signal to an external apparatus (e.g., a display apparatus).

The power line of the electronic apparatus 100 may be connected to a power consent providing commercial power (e.g., 90V to 264V), and the electronic apparatus 100 may transmit the commercial power to an external apparatus. The electronic apparatus 100 according to an embodiment may be implemented as various types of apparatuses that supply power to an external apparatus.

An external apparatus may be implemented as a display apparatus and display video data. In some embodiments, the display apparatus may be implemented as a TV, but embodiments are not limited thereto, and in some embodiments, the display apparatus may be implemented as any apparatus without limitation if it is an apparatus equipped with a display function such as a video wall, a large format display (LFD), digital signage, a digital information display (DID), a projector display, etc. In some embodiments, the display apparatus may be implemented as various forms of displays such as a liquid crystal display (LCD), organic light-emitting diodes (OLED), liquid crystal on silicon (LCoS), digital light processing (DLP), a quantum dot (QD) display panel, quantum dot light-emitting diodes (QLED), micro light-emitting diodes (LED), mini LED, etc. In some embodiments, the display apparatus may display an image signal received from the electronic apparatus 100, and may be driven by using the power supplied from the electronic apparatus 100.

In the above description, explanation was described by assuming a case wherein the electronic apparatus 100 is implemented in a form of being separated from an external apparatus. However, this is merely an example, and the disclosure is not limited thereto. In some embodiments, the electronic apparatus 100 and an external apparatus may be implemented as one apparatus. For example, the electronic apparatus 100 may be implemented as one component (e.g., a power supply) of an external apparatus.

The electronic apparatus 100 (e.g., a power supply) may be implemented as a switched mode power supply (SMPS), and may include a power factor correction circuit, i.e., a PFC circuit, for meeting rise of the overall power consumption according to enlargement of the electronic apparatus 100 and various restrictions.

According to an embodiment, the electronic apparatus 100 may be hardware that converts AC power into DC power and supplies power to an internal load of the electronic apparatus 100 (or, an external apparatus) stably. The electronic apparatus 100 may include a plurality of switches, and provide stabilized power to the load by controlling on-off of each of the plurality of switches.

In some embodiments, the electronic apparatus 100 may include a diode bridge (or, a bridge rectifier), an electromagnetic interference (EMI) filter part, etc. As an example, a diode bridge is a bridge circuit wherein four diodes are connected, and may be a component that rectifies an AC input and changes it to a DC output. An EMI filter part may remove electric noise of commercial power.

The electronic apparatus 100 according an embodiment may include the PFC circuit 110. The PFC circuit 110 may be implemented as various types of converters such as a buck converter, a boost converter, and a buck-boost converter, etc.

The electronic apparatus 100 may operate in an intermittent switching mode for minimizing power consumption, and meeting the standards (or, the restrictions) related to standby power. The intermittent switching mode may be referred to as a burst mode, a standby mode, etc., but the intermittent switching mode will be generally referred to as a standby mode below for the convenience of explanation.

In the standby mode, if a size (e.g., amount/level) of a current flowing in the PFC circuit 110 is maintained to be smaller than or equal to a threshold current, the control circuit 120 of the electronic apparatus 100 may operate the PFC circuit 110 in the standby mode.

The control circuit 120 may be implemented as a digital signal control circuit (a digital signal processor (DSP)) processing digital image signals, a micro control circuit (a microprocessor), and a timing controller (T-CON). However, embodiments are not limited thereto, and in some embodiments, the control circuit 120 may include one or more of a central processing unit (CPU), a micro controller unit (MCU), a micro processing unit (MPU), a controller, an application control circuit (an application processor (AP)) or a communication control circuit (a communication processor (CP)), and an ARM control circuit, or may be defined by the terms. In some embodiments, the control circuit 120 may be implemented as a system on chip (SoC) having a processing algorithm stored therein or large scale integration (LSI), or implemented in the form of a field programmable gate array (FPGA).

<Standby Mode of the PFC Circuit 110>

In the standby mode of the PFC circuit 110, the control circuit 120 may detect an output voltage of the PFC circuit 110 as illustrated in the graph in FIG. 1.

If the output voltage of the PFC circuit 110 is smaller than a set value (referred to as a reference voltage hereinafter), the control circuit 120 may apply a signal (e.g., a gate signal) for on-off control of the switch included in the PFC circuit 110. In some embodiments, the signal may include a signal provided to the gate such that a current flows in the switch. In this disclosure, "the feature of turning on the switch" means changing the switch from a non-conductive state to a conductive state. In particular, the feature of turning on the switch means providing a signal to the gate such that a current flows in the switch. In contrast, "the feature of turning off the switch" means changing the switch from a conductive state to a non-conductive state. In particular, the feature of turning off the switch means providing a signal to the gate such that a current does not flow in the switch.

According to an embodiment, if the control circuit 120 applies a signal to the switch, a current flowing in the inductor included in the PFC circuit 110 may increase, and an output voltage of the PFC circuit 110 may also increase.

In an embodiment, if an output voltage of the PFC circuit 110 increases and corresponds to a reference voltage (or, reaches a reference voltage), the control circuit 120 may not apply a signal to the switch.

In the control circuit 120, a peak current is generated in the AC line in the standby mode of the PFC circuit 110, and the peak current may flow in the line filter which is an AC noise filter and a capacitor.

The control circuit 120 may limit a peak current in the standby mode of the PFC circuit 110 for preventing generation of noise according to magnetic interference between the core of the line filter and a chassis metal due to the peak current.

Detailed explanation in this regard will be described with reference to FIG. 3.

Figure 3:
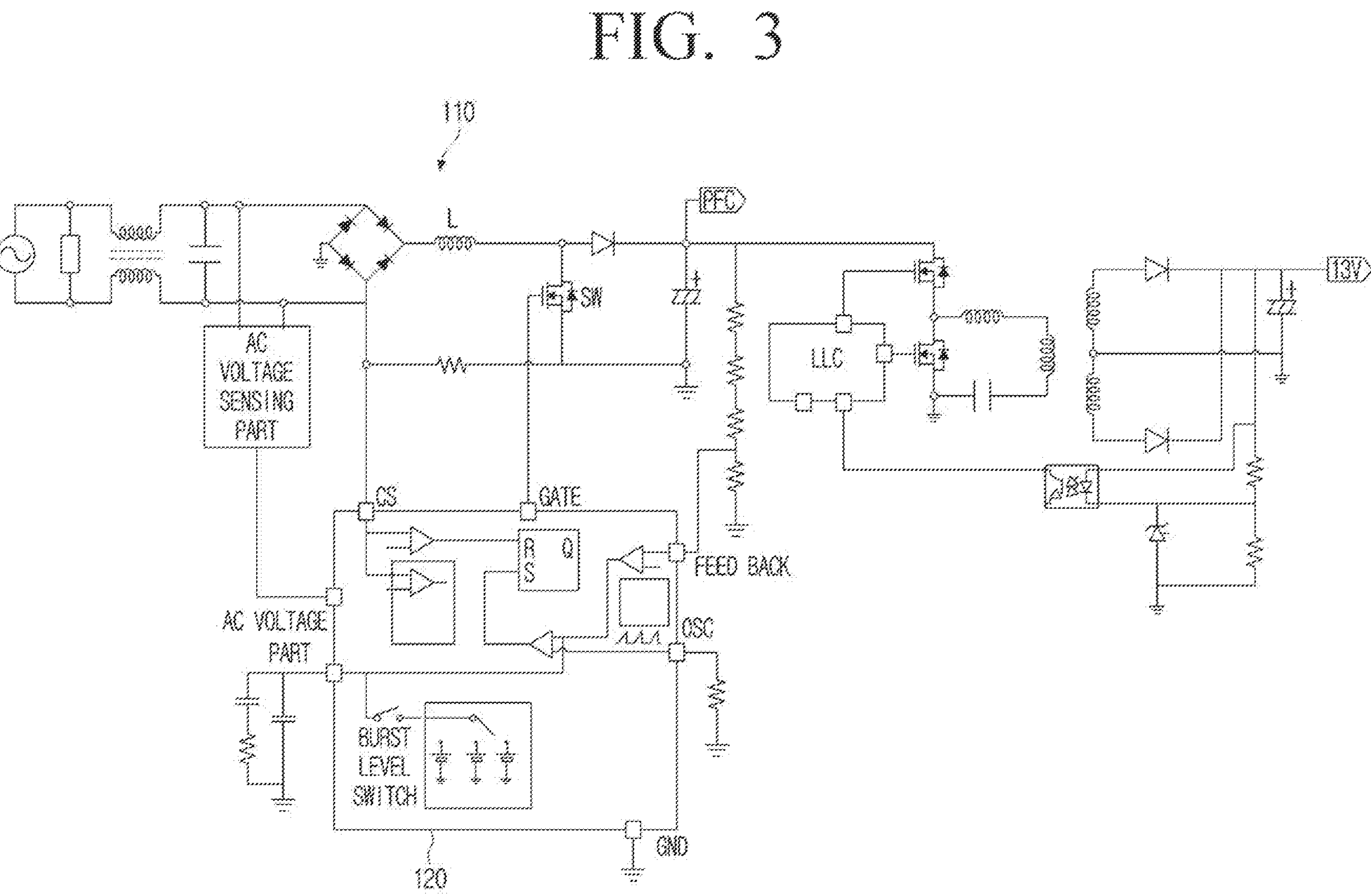
FIG. 3 is a circuit diagram for illustrating configurations of a PFC circuit and a control circuit according to an embodiment.

FIG. 3 is a circuit diagram for illustrating configurations of a PFC circuit and a control circuit according to an embodiment.

Referring to FIG. 3, the PFC circuit 110 may include an inductor L and a switch SW serially connected to the inductor L. The control circuit 120 may detect a current in the PFC circuit 110.

If the size of the current flowing in the PFC circuit 110 is maintained to be less than or equal to a threshold current, the control circuit 120 may operate the PFC circuit 110 in the standby mode.

The control circuit 120 may identify a reference current level for limiting a peak current of the inductor L included in the PFC circuit 110 in the standby mode, and identify an on-off frequency of the switch SW based on the identified reference current level.

The control circuit 120 may apply a signal to the switch SW based on the on-off frequency of the switch.

Figure 4:
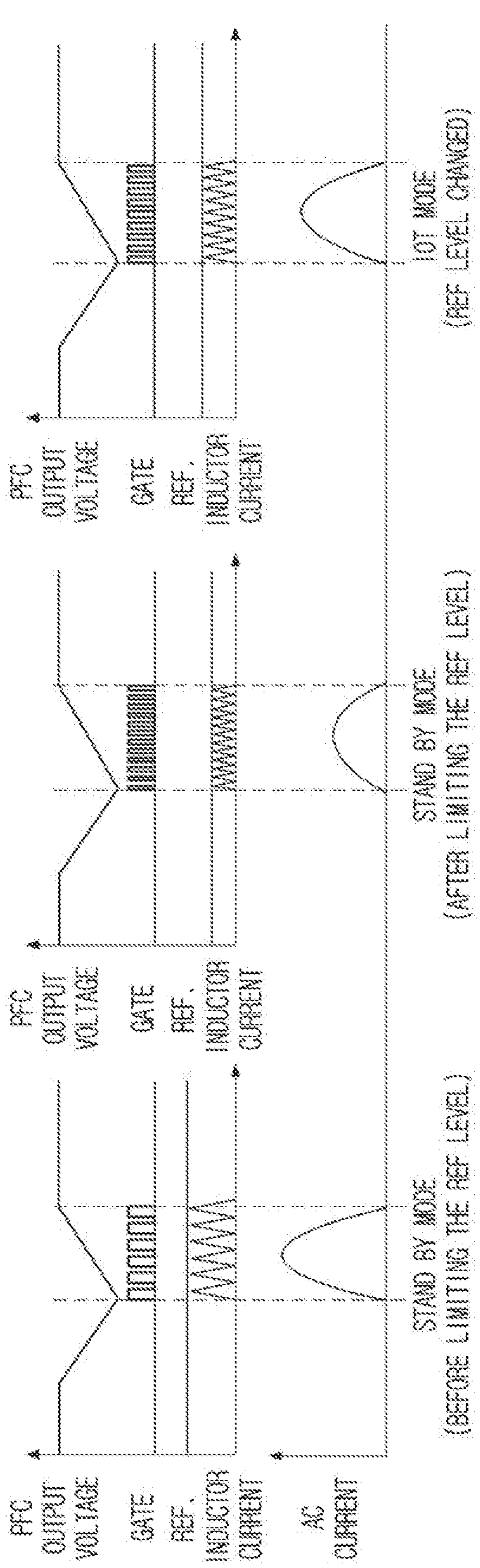
FIG. 4 is a graph for illustrating a plurality of reference current levels according to an embodiment.

FIG. 4 is a graph for illustrating a plurality of reference current levels according to an embodiment. The graph illustrates an AC current, an inductor current, a reference level (REF.), a gate signal (GATE), and a PFC output voltage in standby and IoT modes, and before and after limiting the reference level (REF.).

Referring to the graph on the left side of FIG. 4, if the size of a current flowing in the PFC circuit 110 is maintained to be less than or equal to the threshold current, the control circuit 120 may operate the PFC circuit 110 in the standby mode.

For example, in the standby mode of the PFC circuit 110, the control circuit 120 may identify a first reference current level among a plurality of reference current levels, and apply a signal for on-off control of the switch SW to the switch SW based on a first frequency corresponding to the first reference current level.

As an example, referring to the graph on the left side of FIG. 4, the peak current of the inductor is relatively large, and thus the maximum size/amount of the current flowing in the AC line of the PFC circuit 110 is also relatively large, and due to this, there is a risk that shaking of the magnetic body of the line filter may be generated.

In the standby mode of the PFC circuit 110, the control circuit 120 may identify a second reference current level among the plurality of reference current levels, and apply a signal for on-off control of the switch SW to the switch SW based on a second frequency corresponding to the second reference current level.

Specifically, the peak current of the inductor illustrated in the graph in the center part of FIG. 4 is relatively smaller than the peak current of the inductor illustrated in the graph on the left side of FIG. 4.

According to an embodiment, if the control circuit 120 identifies the second reference current level among the plurality of reference current levels, and applies a signal for on-off control of the switch SW to the switch SW based on the second frequency corresponding to the second reference current level for limiting the peak current of the inductor L, since the peak current of the inductor L is relatively limited (i.e., since the peak current of the inductor L is relatively small), the maximum amount of a current flowing in the AC line of the PFC circuit 110 is relatively small, and by virtue of this, a risk that shaking of the magnetic body of the line filter may be generated can be prevented.

According to an embodiment, the peak current of the inductor L according to the first reference current level may be relatively larger than the peak current of the inductor L according to the second reference current level, and the first frequency according to the first reference current level may be relatively smaller than the second frequency according to the second reference current level.

The problem of generation of noise in the burst mode, i.e., the standby mode of the PFC circuit 110, may be generated when the size/amount of an input AC voltage of the PFC circuit 110 is less than a threshold voltage (e.g., less than 110 Vac). For example, if the size/amount of an input AC voltage is small, the on time of the switch SW (switch on time) becomes longer to generate a high voltage, and since the on time becomes longer, a current flowing in the inductor L increases.

As another example, if the size/amount of an input AC voltage of the PFC circuit 110 is greater than or equal to the threshold voltage, there may not be a risk of the generation of noise in the standby mode of the PFC circuit 110, and thus the control circuit 120 may be connected to the AC voltage part and detect the size/amount of an input AC voltage, and only when the size/amount of the input AC voltage is less than the threshold voltage, may identify any one reference current level of the plurality of reference current levels for limiting the peak current of the inductor L.

For example, the control circuit 120 may be connected to the AC voltage part and detect an input AC voltage. Referring to FIG. 3, the control circuit 120 may detect an input AC voltage through an AC voltage sensing part connected to the AC voltage part.

Then, if the size/amount of the input AC voltage is greater than or equal to the threshold voltage, the control circuit 120 may identify a first reference current level among the plurality of reference current levels, and apply a signal to the switch SW based on the on-off first frequency of the switch SW corresponding to the first reference current level. The graph on the left side of FIG. 4 is an example of waveforms of the peak current of the inductor L and the first frequency and a waveform of the AC current according to the first reference current level.

As another example, if the size/amount of the input AC voltage is less than the threshold voltage, the control circuit 120 may identify a second reference current level among the plurality of reference current levels, and apply a signal to the switch SW based on the on-off second frequency of the switch SW corresponding to the second reference current level. The graph on the center part of FIG. 4 is an example of waveforms of the peak current of the inductor L and the second frequency and a waveform of the AC current according to the second reference current level.

According to an embodiment, in the standby mode of the electronic apparatus 100, the amount of a current flowing in the PFC circuit may increase more than the threshold current.

For example, some functions may be activated (e.g., activation of the communication interface for an Internet of Things (IoT) operation of being connected to a server, activation of a voice recognition module of the electronic apparatus 100, activation of the sub processor from among the main processor and the sub processor, etc.) in the standby mode of the electronic apparatus 100, and as some functions are activated, the load of the power supply may increase.

According to an embodiment, when the load of the power supply increases (i.e., when the amount of a current flowing in the PFC circuit 110 increases more than the threshold current), if the control circuit 120 limits the peak current of the inductor L according to the reference current level, there is a risk that high frequency noise due to an audible frequency may be generated as the frequency of a signal applied to the switch SW increases.

The control circuit 120 according to an embodiment may limit the peak current of the inductor L by flexibly changing the reference current level in the standby mode of the electronic apparatus 100, and at the same time, control the PFC circuit 110 such that the frequency of a signal applied to the switch SW does not increase as much as an audible frequency.

For example, the peak current of the inductor L illustrated in the graph on the right side of FIG. 4 is relatively smaller than the peak current of the inductor L illustrated in the graph on the left side of FIG. 4, and is relatively bigger than the peak current of the inductor illustrated in the graph in the center part of FIG. 4.

If power required in the standby mode increases (if the load of the electronic apparatus 100 increases), the control circuit 120 may identify a third reference current level among the plurality of reference current levels. The control circuit 120 may apply a signal for controlling on-off of the switch SW to the switch SW based on the third frequency corresponding to the third reference current level.

The graph on the right side of FIG. 4 is an example of waveforms of the peak current of the inductor L and the third frequency and a waveform of the AC current according to the third reference current level.

Referring to the graph on the right side of FIG. 4, the peak current of the inductor L in the third reference current level is less than the peak current of the inductor L illustrated in the graph on the left side of FIG. 4, and the frequency is less than the frequency illustrated in the graph in the center part of FIG. 4, and thus the maximum amount of a current flowing in the AC line of the PFC circuit 110 is relatively small, and the frequency of the signal applied to the switch SW is also relatively low, and accordingly, a risk of generation of noise can be prevented.

Figure 5:
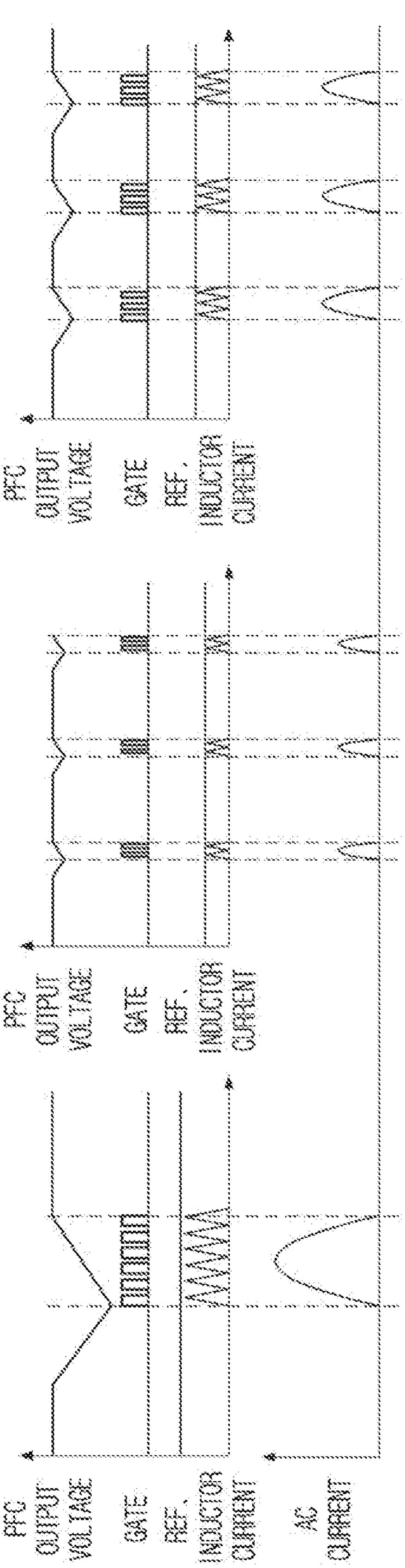
FIG. 5 is a graph for illustrating a plurality of threshold output voltages according to an embodiment.

FIG. 5 is a graph for illustrating a plurality of threshold output voltages according to an embodiment.

The control circuit 120 according to an embodiment may flexibly change the threshold output voltage as well as the reference current level in the standby mode. For example, the control circuit 120 may identify the threshold output voltages corresponding to each of the plurality of reference current levels, and change the reference current levels and the threshold output voltages.

Specifically, the control circuit 120 according to an embodiment may identify any one reference current level among the plurality of reference current levels for limiting the peak current of the inductor L in the standby mode.

The control circuit 120 may identify any one threshold output voltage corresponding to the identified any one reference current level from among the plurality of threshold output voltages corresponding to the standby mode.

If the output voltage of the PFC circuit 110 is less than the identified threshold output voltage, the control circuit 120 may apply a signal for controlling on-off of the switch SW to the switch SW based on a frequency corresponding to the identified reference current level.

The control circuit 120 may detect an input AC voltage through the AC voltage sensing part connected to the AC voltage part.

Referring to the graph on the left side of FIG. 5, if the size/amount of an input AC voltage is greater than or equal to the threshold voltage, the control circuit 120 may identify the first reference current level among the plurality of reference current levels, and identify the first threshold output voltage corresponding to the first reference current level from among the plurality of threshold output voltages corresponding to the standby mode.

As another example, referring to the graph in the center part of FIG. 5, if the size/amount of an input AC voltage is less than the threshold voltage, the control circuit 120 may identify the second reference current level for limiting the peak current of the inductor L among the plurality of reference current levels.

The control circuit 120 may identify the second threshold output voltage corresponding to the second reference current level from among the plurality of threshold output voltages. If the output voltage of the PFC circuit 110 is less than the second threshold output voltage, the control circuit 120 may apply a signal for controlling on-off of the switch SW to the switch SW in the second frequency corresponding to the second reference current level.

The first threshold output voltage may be relatively less than the second threshold output voltage.

Accordingly, if the second threshold output voltage is identified, a case in which the output voltage of the PFC circuit 110 is less than the second threshold output voltage occurs more frequently, and a signal is applied to the switch SW while the output voltage of the PFC circuit 110 is reduced relatively less, and accordingly, the output voltage can reach the reference voltage more quickly, and thus the switch on time can be reduced.

The graph in the center part of FIG. 5 is an example of an output voltage of the PFC circuit 110 according to the second threshold output voltage, a peak current of the inductor L according to the second reference current level, and a waveform of the second frequency and a waveform of an AC current.

If power required in the standby mode increases (if the load of the electronic apparatus 100 increases), the control circuit 120 according to an embodiment may identify the third reference current level among the plurality of reference current levels.

The control circuit 120 may identify the third threshold output voltage corresponding to the third reference current level among the plurality of threshold output voltages.

If the output voltage of the PFC circuit 110 is less than the third threshold output voltage, the control circuit 120 may apply a signal for controlling on-off of the switch SW to the switch SW based on the third frequency corresponding to the third reference current level.

The graph on the right side of FIG. 5 is an example of an output voltage of the PFC circuit 110 according to the third threshold output voltage, a peak current of the inductor L according to the third reference current level, and a waveform of the third frequency and a waveform of an AC current.

Referring to the graph on the right side of FIG. 5, the third threshold output voltage is larger than the first threshold output voltage illustrated in the graph on the left side of FIG. 5, and is less than the second threshold output voltage illustrated in the graph in the center part of FIG. 5, and thus the time required for the output voltage of the PFC circuit 110 to reach the reference voltage, i.e., the switch on time, may be shorter than the case of the first threshold output voltage, and may be longer than the case of the second threshold output voltage.

Figure 6:
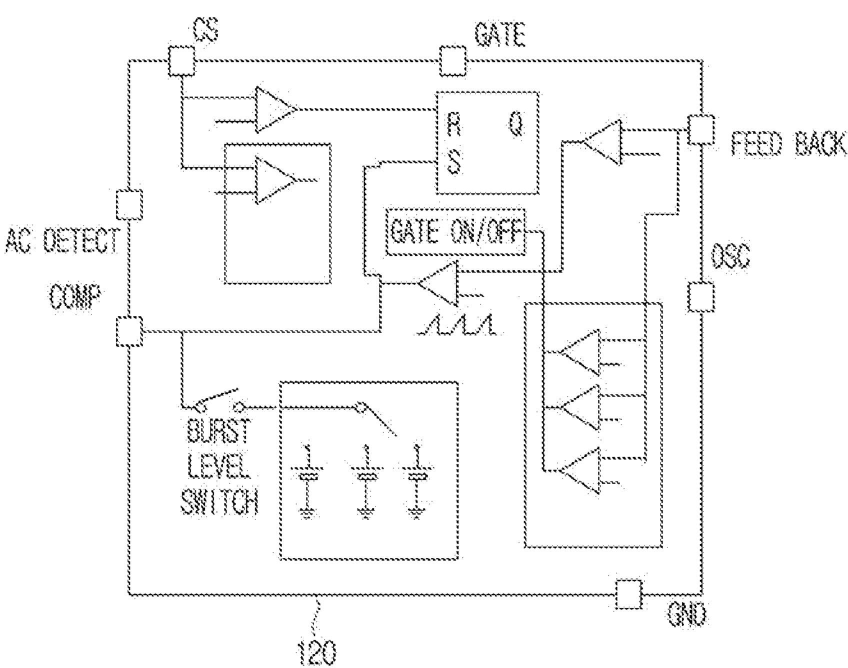
FIG. 6 is a circuit diagram for illustrating in detail a control circuit according to an embodiment.

FIG. 6 is a circuit diagram for illustrating in detail a control circuit according to an embodiment.

Referring to FIG. 6, the control circuit 120 may include a current detection part, a reference current level adjustment part (or, a burst level adjustment part), and a threshold output voltage adjustment part (or, an output voltage adjustment part).

According to an embodiment, the control circuit 120 may detect an output voltage of the PFC circuit 110, and if the output voltage is less than a threshold output voltage, the control circuit 120 may increase the output voltage by controlling on-off of the switch Sw.

According to an embodiment, the reference current level adjustment part and the threshold output voltage adjustment part may operate in association.

As an example, if an input AC voltage is less than the threshold voltage in the standby mode, the control circuit 120 may identify the second reference current level among the plurality of reference current levels by using the reference current level adjustment part.

The control circuit 120 may identify the second threshold output voltage among the plurality of threshold output voltages by using the threshold output voltage adjustment part based on the identified second reference current level.

Accordingly, the control circuit 120 according to an embodiment may not adjust only the peak current of the inductor L, but also adjust the switch on time, and can thereby prevent a risk of generation of noise by reducing both the peak size and amount of a current flowing in the AC line.

The various embodiments which limit the peak current by adjusting the reference current level, and limit the frequency may be implemented in various types of converters such as an AC/DC converter, a DC/DC converter, etc.

Figure 7:
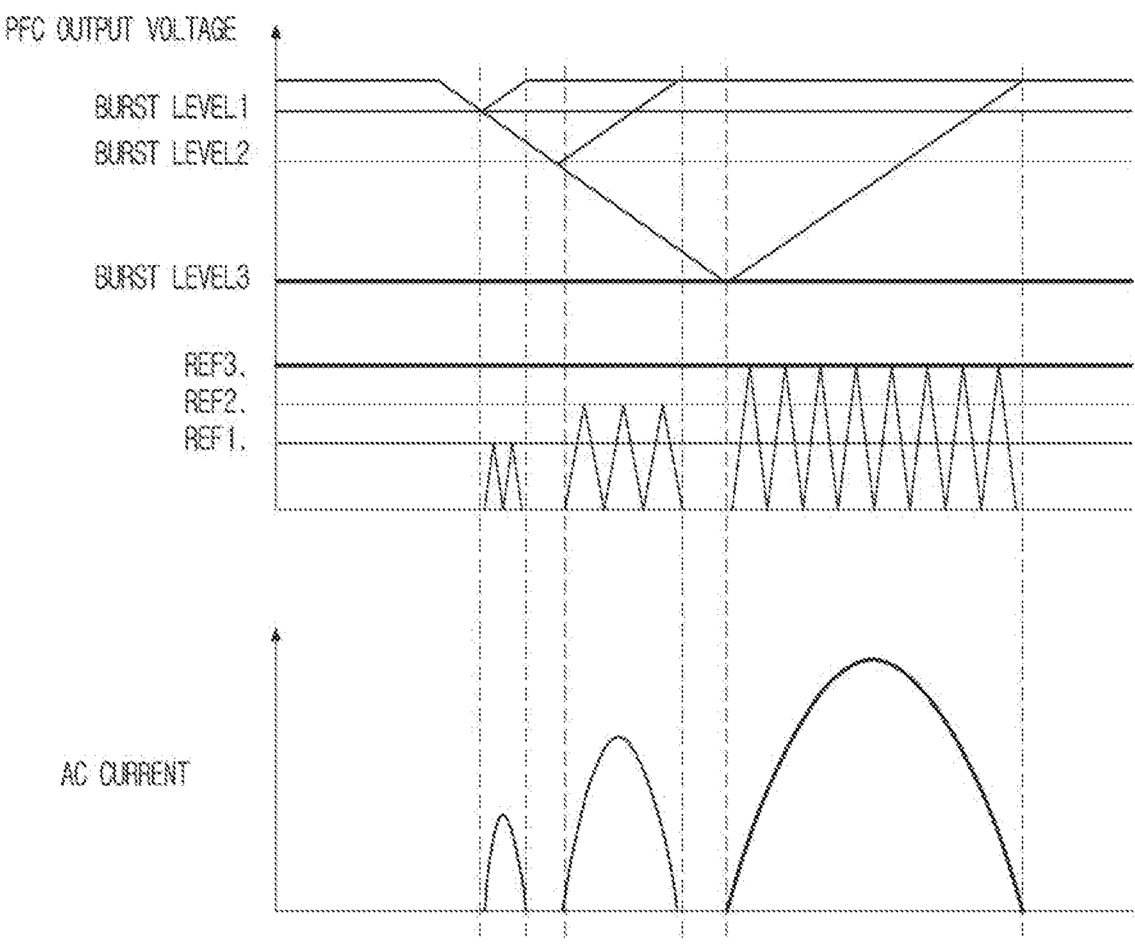
FIG. 7 is a graph for illustrating change of an amount of an AC current according to a reference current level and a threshold output voltage according to an embodiment.

FIG. 7 is a graph for illustrating change of an amount of an AC current according to a reference current level and a threshold output voltage according an embodiment.

Referring to FIG. 7, if the reference current level is the first reference current level (Ref 1.), and the threshold output voltage is the first threshold output voltage (Burst level 1)

corresponding to the first reference current level (Ref 1.), since the peak current of the inductor L is relatively the smallest and the switch on time is relatively the shortest, both the size of the threshold output voltage and the amount of the AC current may be the smallest.

Accordingly, when the size/amount of an input AC voltage is smaller than the threshold voltage, if the control circuit 120 applies a signal to the switch SW based on the first reference current level (Ref 1.) and the first threshold output voltage (Burst level 1), noise due to the AC current may not be generated.

As another example, if the size/amount of an output voltage required for the PFC circuit 110 increases (or, if the load increases), the control circuit 120 may not maintain the first reference current level (Ref 1.), but may adjust the reference current level to the second reference current level (Ref 2.), and adjust the threshold output voltage to the second threshold output voltage (Burst level 2) corresponding to the second reference current level (Ref 2.).

Accordingly, for meeting the output voltage required for the PFC circuit 110, the switch on time may be increased while relatively increasing the peak current of the inductor L, but not increasing the frequency of a signal applied to the switch SW.

As still another example, if the size/amount of an input AC voltage is greater than or equal to the threshold voltage, noise due to the AC current may not be generated even if the control circuit 120 applies a signal to the switch SW based on the third reference current level (Ref 3.) and the third threshold output voltage (Burst level 3).

In the various embodiments described above, the reference current levels are described as the first reference current level to the third reference current level for the convenience of explanation, but the reference current levels can be segmented in more various ways. For example, in some embodiments, more or fewer that three reference current levels may be used.

For the convenience of explanation, the threshold output voltages are described as the first threshold output voltage to the third threshold output voltage, but embodiments are not limited thereto, and the threshold output voltages can be segmented in more various ways. For example, in some embodiments, more or fewer that three threshold output voltages may be used.

For the convenience of explanation, explanation was described based on the assumption that each of the first reference current level to the third reference current level corresponds to the first threshold output voltage to the third threshold output voltage, but embodiments are not limited thereto.

For example, depending on implementation examples, embodiments may be implemented such that the first reference current level and the third threshold output voltage can operate in association, or the third reference current level and the first threshold output voltage can operate in association.

For the convenience of explanation, explanation was described by assuming a case wherein the threshold output voltage is dependent on the reference current level, and the threshold output voltage is adjusted to a case wherein the reference current level is adjusted, but this is merely an example, and in some embodiments, the threshold output voltage may be adjusted independently from the reference current level.

For example, depending on implementation examples, the control circuit may maintain the reference current level, and may adjust only the threshold output voltage to any one of the plurality of threshold output voltages.

Figure 8:
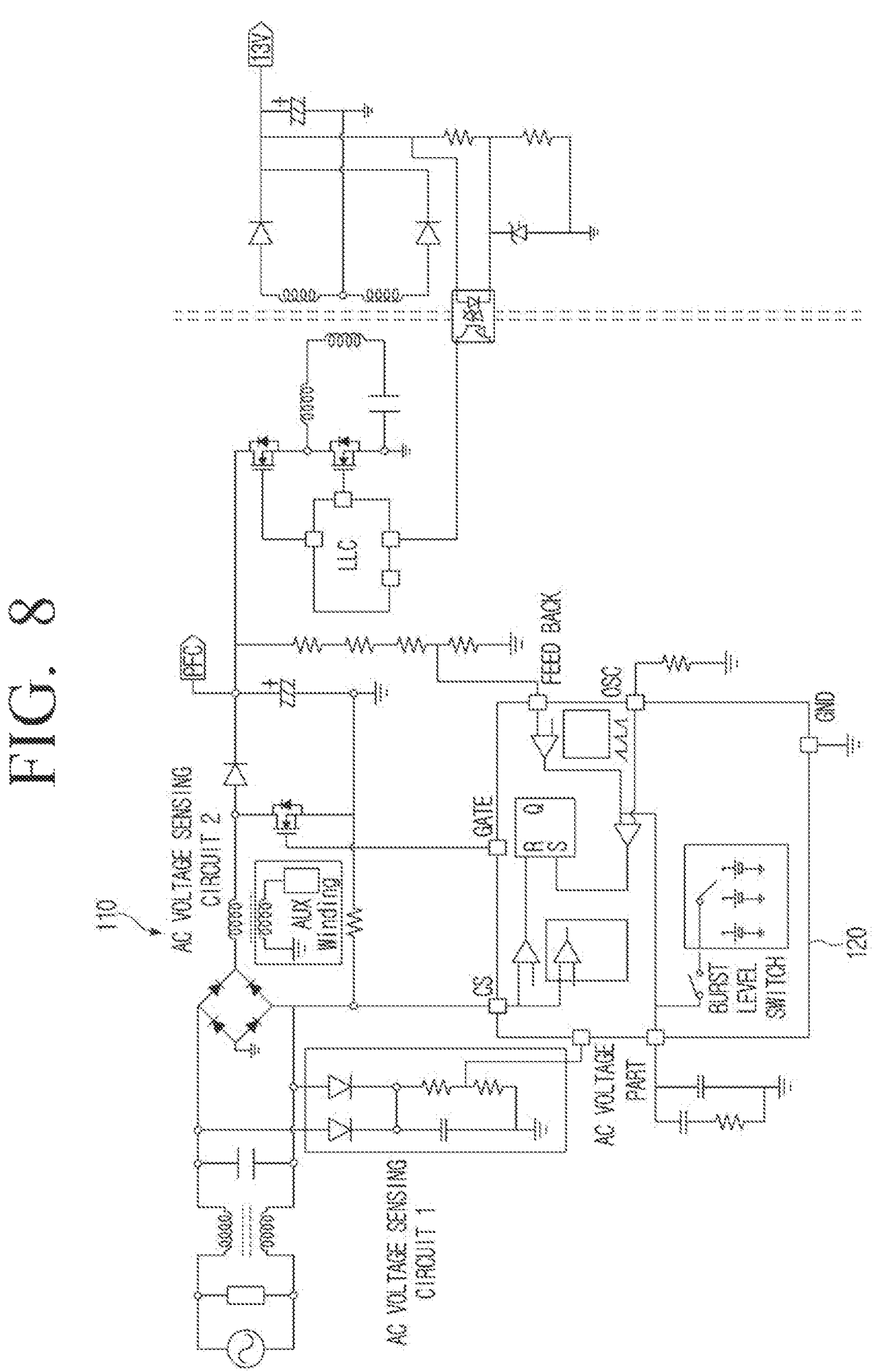
FIG. 8 is a circuit diagram for illustrating detection of an input AC voltage according to an embodiment.

FIG. 8 is a circuit diagram for illustrating detection of an input AC voltage according to an embodiment.

Referring to FIG. 8, the control circuit 120 may detect an input AC voltage through the AC voltage sensing part connected to the AC voltage part.

For example, the control circuit 120 may detect an AC voltage by using a rectifier diode connected to the AC line as illustrated in the AC voltage sensing circuit 1.

However, this is merely an example, and in some embodiments as illustrated in FIG. 8, the control circuit 120 may detect an AC voltage such that an AUX winding is added to the inductor L of the PFC circuit 110 as illustrated in the AC voltage sensing circuit 2, and a voltage of the inductor is added, and the integrated circuit (IC) provided in the PFC circuit 110 detects the size/amount of an AC voltage. The control circuit may adjust at least one of the reference current level or the threshold output voltage based on the size/amount of the AC voltage detected by the IC.

Figure 9:
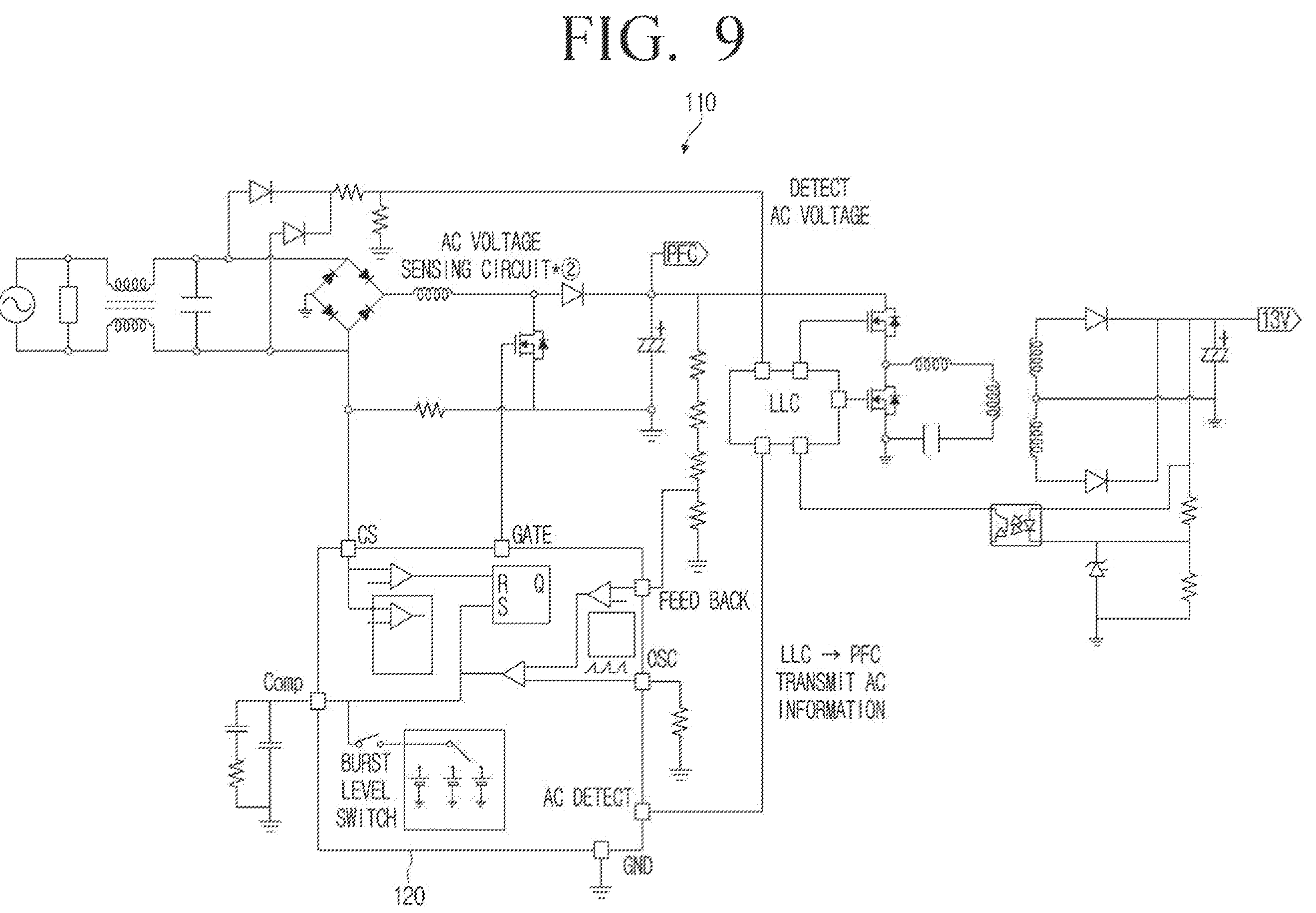
FIG. 9 is a circuit diagram for illustrating a control circuit that detects a size of an AC voltage from an LLC converter according to an embodiment.

FIG. 9 is a circuit diagram for illustrating a control circuit that detects the size/amount of an AC voltage from an LLC converter according to an embodiment.

As illustrated in FIG. 9, the control circuit 120 may detect an AC voltage through an LLC converter (LLC), e.g., a DC/DC block, and transmit information related to the size/amount of the AC voltage to the control circuit 120, and the control circuit 120 may adjust at least one of the reference current level or the threshold output voltage based on the information related to the size/amount of the AC voltage received from the LLC converter (LLC).

The various embodiments described above assume a case in which the electronic apparatus 100 is in the standby mode, and if the electronic apparatus 100 is in the normal mode, the control circuit 120 may not limit the peak current of the inductor L (i.e., may not operate the PFC circuit 110 in the burst mode), and apply a signal for controlling on-off of the switch SW to the switch SW based on the output voltage and the output current of the PFC circuit 110.

Figure 10:
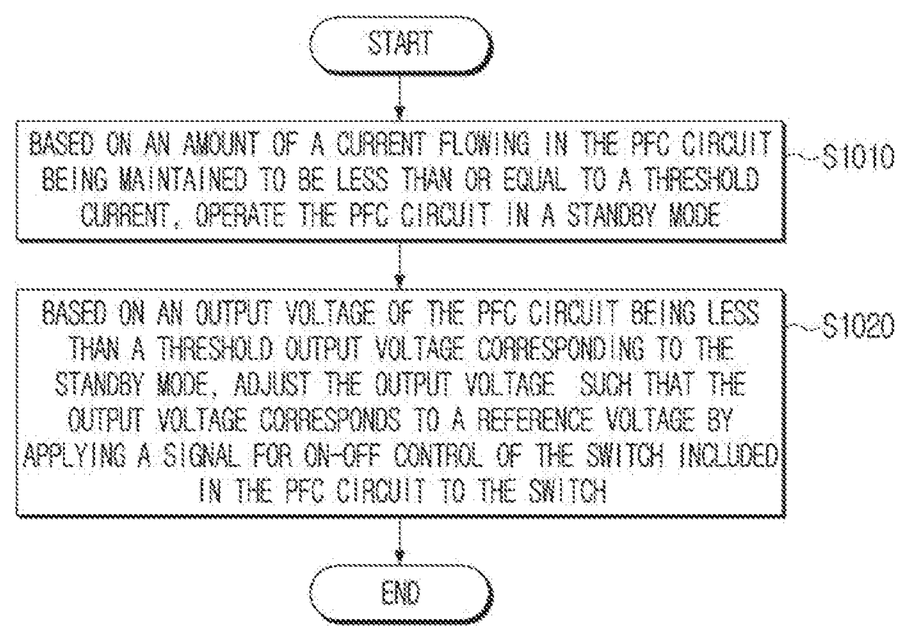
FIG. 10 is a flow chart for illustrating a control method of an electronic apparatus according to an embodiment.

FIG. 10 is a flow chart for illustrating a control method of an electronic apparatus according to an embodiment.

In a control method of an electronic apparatus including a power factor correction (PFC) circuit and a control circuit controlling operations of the PFC circuit, first, based on the amount of a current flowing in the PFC circuit being maintained to be less than or equal to a threshold current, the PFC circuit is operated in a standby mode in operation S1010.

Based on an output voltage of the PFC circuit being less than a threshold output voltage corresponding to the standby mode, the output voltage is adjusted such that the output voltage corresponds to a reference voltage by applying a signal for on-off control of the switch SW included in the PFC circuit to the switch SW in operation S1020.

The operation S1020 of adjusting the output voltage includes operations of identifying an on-off frequency of the switch SW based on a reference current level for limiting a peak current of the inductor L included in the PFC circuit in the standby mode, and applying the signal to the switch SW based on the on-off frequency of the switch SW.

According to one or more embodiments, the operation S1020 of adjusting the output voltage may include operations of being connected to an AC voltage part and detecting an input AC voltage, based on the size/amount of the input AC voltage being greater than or equal to a threshold voltage, identifying a first reference current level among a plurality of reference current levels, applying the signal to the switch SW based on an on-off first frequency of the switch SW corresponding to the first reference current level, based on the size/amount of the input AC voltage being smaller than the threshold voltage, identifying a second reference current level among the plurality of reference current levels, and applying the signal to the switch SW based on an on-off second frequency of the switch SW corresponding to the second reference current level, wherein the peak current of the inductor L according to the first reference current level may be relatively larger than the peak current of the inductor L according to the second reference current level.

According to one or more embodiments, the operation S1020 of adjusting the output voltage may include operations of identifying a second reference current level among a plurality of reference current levels in the standby mode, applying the signal to the switch SW based on an on-off second frequency of the switch SW corresponding to the second reference current level, based on the amount of the current flowing in the PFC circuit increasing more than the threshold current in the standby mode, identifying a third reference current level among the plurality of reference current levels, and applying the signal to the switch SW based on an on-off third frequency of the switch SW corresponding to the third reference current level, wherein the peak current of the inductor L according to the third reference current level may be relatively larger than the peak current of the inductor L according to the second reference current level.

According to one or more embodiments, the operation S1020 of adjusting the output voltage may include operations of identifying any one reference current level among a plurality of reference current levels for limiting the peak current of the inductor L in the standby mode, identifying any one threshold output voltage corresponding to the any one reference current level among a plurality of threshold output voltages corresponding to the standby mode, and based on the output voltage of the PFC circuit being less than the any one threshold output voltage, applying the signal to the switch SW based on an on-off frequency of the switch SW corresponding to the any one reference current level.

The operation S1020 of adjusting the output voltage may include operations of being connected to an AC voltage part and detecting an input AC voltage, based on the size/amount of the input AC voltage being greater than or equal to a threshold voltage, identifying a first reference current level among a plurality of reference current levels, and identifying a first threshold output voltage corresponding to the first reference current level among the plurality of threshold output voltages corresponding to the standby mode.

The operation S1020 of adjusting the output voltage may include operations of, based on the size/amount of the input AC voltage being less than the threshold voltage, identifying a second reference current level among the plurality of reference current levels, and identifying a second threshold output voltage corresponding to the second reference current level among the plurality of threshold output voltages corresponding to the standby mode, wherein the peak current of the inductor L according to the first reference current level may be relatively larger than the peak current of the inductor L according to the second reference current level, and the first threshold output voltage may be relatively less than the second threshold output voltage.

The operation S1020 of adjusting the output voltage may include operations of detecting an AC voltage from at least one of the inductor included in the PFC circuit or an LLC converter connected to the PFC circuit, and based on the size/amount of the detected AC voltage being greater than or equal to a threshold voltage, identifying a first reference current level among a plurality of reference current levels, applying a signal with an on-off first frequency of the switch SW corresponding to the first reference current level to the switch SW, and based on the size/amount of the detected AC voltage being less than the threshold voltage, identifying a second reference current level among the plurality of reference current levels, and applying a signal to the switch SW based on an on-off second frequency of the switch SW corresponding to the second reference current level.

In some embodiments, the control circuit may not, based on the electronic apparatus being in a normal mode, limit the peak current of the inductor.

The various embodiments may be implemented not only in electronic apparatuses, but also to all types of electronic apparatuses including an SMPS.

The aforementioned various embodiments may be implemented in a recording medium that can be read by a computer or an apparatus similar to a computer, by using software, hardware, or a combination thereof. In some cases, the embodiments described in this specification may be implemented as the processor itself. According to implementation by software, the embodiments such as procedures and functions described in this specification may be implemented as separate software modules. Each of the software modules can perform one or more functions and operations described in this specification.

Computer instructions for performing processing operations of the electronic apparatus 100 according to the aforementioned various embodiments may be stored in a non-transitory computer-readable medium. Computer instructions stored in such a non-transitory computer-readable medium make the processing operations at the electronic apparatus 100 according to the aforementioned various embodiments performed by a specific machine, when the instructions are executed by the processor of the specific machine. That is, a processor (such as a microprocessor or microcontroller, etc.) may access the computer instructions stored in the non-transitory computer-readable medium and execute the computer instructions to cause the processor to implement the processing operations discussed above.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While various embodiments have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:

a power factor correction (PFC) circuit including an inductor and a switch serially connected to the inductor; and a control circuit configured to:

based on an amount of current flowing in the PFC circuit being less than or equal to a threshold current, operate the PFC circuit in a standby mode, and based on an output voltage of the PFC circuit being less than a threshold output voltage corresponding to the standby mode, adjust the output voltage such that the output voltage corresponds to a reference voltage by applying a signal for on-off control of the switch included in the PFC circuit to the switch, wherein the control circuit is further configured to:

identify an on-off frequency of the switch based on a reference current level for limiting a peak current of the inductor included in the PFC circuit in the standby mode, and apply the signal to the switch based on the on-off frequency.

2. The electronic apparatus of claim 1, wherein the control circuit is configured to:

detect an input AC voltage, based on the input AC voltage being greater than or equal to a threshold voltage, identify a first reference current level among a plurality of reference current levels, and apply the signal to the switch based on an on-off first frequency of the switch that corresponds to the first reference current level, and based on the input AC voltage being less than the threshold voltage, identify a second reference current level among the plurality of reference current levels, and apply the signal to the switch based on an on-off second frequency of the switch that corresponds to the second reference current level, wherein the peak current of the inductor according to the first reference current level is relatively larger than the peak current of the inductor according to the second reference current level.

3. The electronic apparatus of claim 1, wherein the control circuit is configured to:

identify a second reference current level among a plurality of reference current levels in the standby mode, apply the signal to the switch based on an on-off second frequency of the switch that corresponds to the second reference current level, and based on the amount of current flowing in the PFC circuit increasing more than the threshold current in the standby mode, identify a third reference current level among the plurality of reference current levels, and apply the signal to the switch based on an on-off third frequency of the switch that corresponds to the third reference current level, wherein the peak current of the inductor according to the third reference current level is relatively larger than the peak current of the inductor according to the second reference current level.

4. The electronic apparatus of claim 1, wherein the control circuit is configured to:

identify one reference current level among a plurality of reference current levels for limiting the peak current of the inductor in the standby mode, identify one threshold output voltage that corresponds to the reference current level among a plurality of threshold output voltages corresponding to the standby mode, and based on the output voltage of the PFC circuit being less than the one threshold output voltage, apply the signal to the switch based on an on-off frequency of the switch that corresponds to the one reference current level.

5. The electronic apparatus of claim 4, wherein the control circuit is configured to:

detect an input AC voltage, based on the input AC voltage being greater than or equal to a threshold voltage, identify a first reference current level among the plurality of reference current levels, and identify a first threshold output voltage that corresponds to the first reference current level among the plurality of threshold output voltages corresponding to the standby mode.

6. The electronic apparatus of claim 5, wherein the control circuit is configured to:

based on the input AC voltage being less than the threshold voltage, identify a second reference current level among the plurality of reference current levels, and identify a second threshold output voltage that corresponds to the second reference current level among the plurality of threshold output voltages corresponding to the standby mode, wherein the peak current of the inductor according to the first reference current level is relatively larger than the peak current of the inductor according to the second reference current level, and the first threshold output voltage is relatively smaller than the second threshold output voltage.

7. The electronic apparatus of claim 4, wherein the control circuit is configured to:

identify a second reference current level among the plurality of reference current levels in the standby mode, and identify a second threshold output voltage that corresponds to the second reference current level among the plurality of threshold output voltages corresponding to the standby mode, and based on the amount of current flowing in the PFC circuit increasing more than the threshold current in the standby mode, identify a third reference current level among the plurality of reference current levels, and identify a third threshold output voltage that corresponds to the third reference current level among the plurality of threshold output voltages, wherein the peak current of the inductor according to the third reference current level is relatively larger than the peak current of the inductor according to the second reference current level, and the third threshold output voltage is relatively smaller than the second threshold output voltage.

8. The electronic apparatus of claim 1, wherein the control circuit is configured to:

detect an AC voltage from the inductor included in the PFC circuit or an LLC converter connected with the PFC circuit, or both the inductor and the LLC converter, based on the AC voltage being greater than or equal to a threshold voltage, identify a first reference current level among a plurality of reference current levels, and apply the signal to the switch based on an on-off first frequency of the switch that corresponds to the first reference current level, and based on the AC voltage being less than the threshold voltage, identify a second reference current level among the plurality of reference current levels, and apply the signal to the switch based on an on-off second frequency of the switch that corresponds to the second reference current level.

9. The electronic apparatus of claim 1, wherein the control circuit is configured to:

based on the electronic apparatus being in a normal mode, not limit the peak current of the inductor.

10. A control method of an electronic apparatus comprising a power factor correction (PFC) circuit that includes an inductor and a switch serially connected to the inductor and a control circuit controlling operations of the PFC circuit, the control method comprising:

based on an amount of a current flowing in the PFC circuit being less than or equal to a threshold current, operating the PFC circuit in a standby mode; and based on an output voltage of the PFC circuit being less than a threshold output voltage corresponding to the standby mode, adjusting the output voltage such that the output voltage corresponds to a reference voltage by applying a signal for on-off control of the switch included in the PFC circuit to the switch, wherein the adjusting the output voltage comprises:

identifying an on-off frequency of the switch based on a reference current level for limiting a peak current of the inductor in the standby mode; and applying the signal to the switch based on the on-off frequency of the switch.

11. The control method of claim 10, wherein the adjusting the output voltage comprises:

detecting an input AC voltage;

based on the input AC voltage being greater than or equal to a threshold voltage, identifying a first reference current level among a plurality of reference current levels;

applying the signal to the switch based on an on-off first frequency of the switch that corresponds to the first reference current level;

based on the input AC voltage being less than the threshold voltage, identifying a second reference current level among the plurality of reference current levels; and applying the signal to the switch based on an on-off second frequency of the switch that corresponds to the second reference current level, wherein the peak current of the inductor according to the first reference current level is relatively larger than the peak current of the inductor according to the second reference current level.

12. The control method of claim 10, wherein the adjusting the output voltage comprises:

identifying a second reference current level among a plurality of reference current levels in the standby mode;

applying the signal to the switch based on an on-off second frequency of the switch that corresponds to the second reference current level;

based on the amount of the current flowing in the PFC circuit increasing more than the threshold current in the standby mode, identifying a third reference current level among the plurality of reference current levels; and applying the signal to the switch based on an on-off third frequency of the switch that corresponds to the third reference current level, wherein the peak current of the inductor according to the third reference current level is relatively larger than the peak current of the inductor according to the second reference current level.

13. The control method of claim 10, wherein the adjusting the output voltage comprises:

identifying one reference current level among a plurality of reference current levels for limiting the peak current of the inductor in the standby mode;

identifying one threshold output voltage that corresponds to the one reference current level among a plurality of threshold output voltages corresponding to the standby mode; and based on the output voltage of the PFC circuit being less than the one threshold output voltage, applying the signal to the switch based on an on-off frequency of the switch that corresponds to the one reference current level.

14. The control method of claim 13, wherein the adjusting the output voltage comprises:

detecting an input AC voltage;

based on the input AC voltage being greater than or equal to a threshold voltage, identifying a first reference current level among the plurality of reference current levels; and identifying a first threshold output voltage that corresponds to the first reference current level among the plurality of threshold output voltages corresponding to the standby mode.

15. The control method of claim 14, wherein the adjusting the output voltage comprises:

based on the input AC voltage being less than the threshold voltage, identifying a second reference current level among the plurality of reference current levels; and identifying a second threshold output voltage that corresponds to the second reference current level among the plurality of threshold output voltages corresponding to the standby mode, wherein the peak current of the inductor according to the first reference current level is relatively larger than the peak current of the inductor according to the second reference current level, and the first threshold output voltage is relatively smaller than the second threshold output voltage.

16. An electronic apparatus comprising:

a power factor correction (PFC) circuit including an inductor and a switch serially connected to the inductor; and a control circuit configured to:

detect an amount of current flowing in the PFC circuit and, based on the amount of current being less than or equal to a threshold current, control the PFC circuit to operate the PFC circuit in a standby mode, identify an on-off frequency of the switch based on a reference current level for limiting a peak current of the inductor in the PFC circuit in the standby mode; and detect an output voltage of the PFC circuit and, based on the output voltage being less than a threshold output voltage that corresponds to the standby mode, adjust the output voltage to correspond to a reference voltage by applying a signal with the on-off frequency to the switch included in the PFC circuit.

17. The electronic apparatus of claim 16, wherein the control circuit is configured to:

detect an input AC voltage;

based on the input AC voltage being greater than or equal to a threshold input voltage, identify a first reference current level among a plurality of reference current levels, the on-off frequency being a first frequency corresponding to the first reference current level; and based on the input AC voltage being less than the threshold input voltage, identify a second reference current level among the plurality of reference current levels, the on-off frequency being a second frequency corresponding to the second reference current level;

wherein the peak current of the inductor according to the first reference current level is relatively larger than the peak current of the inductor according to the second reference current level.

18. The electronic apparatus of claim 17, wherein the control circuit is configured to:

based on the amount of current flowing in the PFC circuit increasing more than the threshold current in the standby mode, identify a third reference current level among the plurality of reference current levels, the on-off frequency being a third frequency correspond to the third reference current level, wherein the peak current of the inductor according to the third reference current level is relatively larger than the peak current of the inductor according to the second reference current level.

* * * * *